(12) United States Patent
Walker et al.

(10) Patent No.: US 8,738,614 B2
(45) Date of Patent: May 27, 2014

(54) METHODS AND APPARATUS FOR PROVIDING HIERARCHICAL CONTENT FLOW IN A DATA NETWORK

(75) Inventors: Gordon Kent Walker, Poway, CA (US); George Alan Wiley, San Diego, CA (US); Ricardo Jorge Lopez, San Marcos, CA (US); Richard Doil Lane, San Diego, CA (US); Rajiv Vijayan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1657 days.

(21) Appl. No.: 11/112,238

(22) Filed: Apr. 21, 2005

(65) Prior Publication Data

US 2005/0256873 A1 Nov. 17, 2005

Related U.S. Application Data

(60) Provisional application No. 60/565,145, filed on Apr. 23, 2004.

(51) Int. Cl.
 *G06F 7/00* (2006.01)
 *G06F 17/30* (2006.01)
(52) U.S. Cl.
 USPC ............................ 707/726; 707/736; 709/228
(58) Field of Classification Search
 USPC .................................. 707/726, 736, 999.003
 See application file for complete search history.

(56) References Cited

U.S. PATENT DOCUMENTS

| | | | | |
|---|---|---|---|---|
| 6,029,045 A * | 2/2000 | Picco et al. | ...................... | 725/34 |
| 6,101,180 A * | 8/2000 | Donahue et al. | ............. | 370/352 |
| 6,154,771 A * | 11/2000 | Rangan et al. | ................. | 709/217 |
| 7,051,274 B1 * | 5/2006 | Cottrille et al. | ............... | 715/210 |
| 7,224,847 B2 * | 5/2007 | Zhang et al. | .................... | 382/254 |
| 2002/0156842 A1* | 10/2002 | Signes et al. | ................... | 709/203 |
| 2002/0184373 A1* | 12/2002 | Maes | ........................... | 709/228 |
| 2003/0101150 A1* | 5/2003 | Agnihotri et al. | ............... | 706/45 |
| 2004/0001104 A1* | 1/2004 | Sommerer et al. | ............ | 345/811 |
| 2004/0107254 A1* | 6/2004 | Ludwig et al. | .................. | 709/204 |
| 2005/0125716 A1* | 6/2005 | Cragun et al. | ................. | 715/512 |
| 2005/0160355 A1* | 7/2005 | Cragun et al. | ................. | 715/512 |
| 2005/0160356 A1* | 7/2005 | Albornoz et al. | ............. | 715/512 |
| 2005/0171754 A1* | 8/2005 | Santodomingo et al. | ........ | 703/21 |
| 2005/0203876 A1* | 9/2005 | Cragun et al. | .................... | 707/3 |

FOREIGN PATENT DOCUMENTS

| | | | |
|---|---|---|---|
| JP | 2002344399 A | | 11/2002 |
| WO | 0247384 | | 6/2002 |
| WO | WO 02/47384 | * | 6/2002 |
| WO | 02086764 | | 10/2002 |

OTHER PUBLICATIONS

Chavey, Darrah, "Songs and the Analysis of Algorithms"; ACM 1996.*
International Search Report—PCT/US06/013744, International Searching Authority—European Patent Office, Jul. 26, 2005.
Written Opinion—PCT/US06/013744, International Searching Authority—European Patent Office, Jul. 26, 2005.
International Preliminary Report on Patentabiity—PCT/US06/013744—IPEA/US, Jan. 13, 2006.

* cited by examiner

*Primary Examiner* — Daniel Kuddus
(74) *Attorney, Agent, or Firm* — The Marbury Law Group, PLLC (57) ABSTRACT

System for providing hierarchical services in a data network. A method is provided for inserting content into a content stream for rendering on a device. The method includes obtaining one or more annotation parameters that comprise a content identifier, and determining an insertion point indicator that indicates a location in the content stream. The method also includes retrieving the content based on the content identifier, and inserting the content in the content stream at a location indicated by the insertion point indicator.

43 Claims, 6 Drawing Sheets

METHODS AND APPARATUS FOR PROVIDING HIERARCHICAL CONTENT FLOW IN A DATA NETWORK

CLAIM OF PRIORITY UNDER 35 U.S.C. §119

The present Application for Patent claims priority to Provisional Application No. 60/565,145 entitled "Media FLO Ad Replacement Methods" filed Apr. 23, 2004, and assigned to the assignee hereof and hereby expressly incorporated by reference herein.

BACKGROUND

1. Field

The present invention relates generally to the operation of data networks, and more particularly, to a system for providing hierarchical services in a data network.

2. Background

Data networks, such as wireless communication networks, have to trade off between services customized for a single terminal and services provided to a large number of terminals. For example, the distribution of content (data) to a large number of terminals (subscribers) is a complicated problem. Therefore, it is very important for network administrators, content retailers, and service providers to have a way that allows networked devices to easily and efficiently receive content and/or other network services.

In current content delivery/media distribution systems, a variety of content distribution servers deliver content streams using broadcast or unicast transmissions. For example, wide area distribution servers may broadcast content streams nationwide, while local area distribution servers may broadcast content streams only locally. Typically, a device receives and renders content in a content stream as it is received without modification.

However, the current structure of content delivery means that a device user may have to receive and select from multiple content streams to obtain both national and local content. Additionally, content retailers and/or content providers may have to provide the same advertising, commercials, or other content for inclusion into multiple streams. Unfortunately, this creates a variety of distribution problems that are sometimes addressed by duplicate transmission of content resulting in wasted bandwidth and network inefficiencies.

Therefore, what is needed is a hierarchical distribution system that allows a content stream to be modified to include selected content. For example, the system should operate to allow a nationwide content stream to be modified to include local content, such as news or local advertising. The system should also provide a way for a content stream to be modified to include suitable content from a variety of sources, such as content from other content streams, cached content, or content from a third party.

SUMMARY

In one or more embodiments, a content insertion system is provided that operates to provide hierarchical content distribution services in a data network. For example, the system operates to allow selected content to be inserted into a content stream received at a device. In one embodiment, the system allows content from a content stream, cached content, or content identified by an explicit reference to be inserted into a received content stream. For example, the inserted content may originate from the received content stream, or from a different content stream. Additionally, the system comprises conditional parameters that operate to control that devices receiving a selected content stream operate to insert content according to the described embodiments. Thus, in one or more embodiments, content transmitted in another logical (or physical) channel may be selectively inserted into real-time multimedia content or programs on a playback device.

In one embodiment, a method is provided for inserting content into a content stream for rendering on a device. The method comprises obtaining one or more annotation parameters that comprise a content identifier, and determining an insertion point indicator that indicates a location in the content stream. The method also comprises retrieving the content based on the content identifier, and inserting the content in the content stream at a location indicated by the insertion point indicator.

In one embodiment, an apparatus is provided for inserting content into a content stream for rendering on a device. The apparatus comprises annotation decoding logic that operates to obtain one or more annotation parameters that comprise a content identifier and an insertion point identifier. The apparatus also comprises content insertion logic that operates to retrieve the content based on the content identifier, and insert the content in the content stream at a location indicated by the insertion point identifier.

In one embodiment, an apparatus is provided for inserting content into a content stream for rendering on a device. The apparatus comprises means for obtaining one or more annotation parameters that comprise a content identifier, and means for determining an insertion point indicator that indicates a location in the content stream. The apparatus also comprises means for retrieving the content based on the content identifier, and means for inserting the content in the content stream at a location indicated by the insertion point indicator.

In one embodiment, a computer-readable medium is provided that comprises instructions, which when executed by processor logic, operate to inserting content into a content stream for rendering on a device. The computer-readable medium comprises instructions for obtaining one or more annotation parameters that comprise a content identifier, and instructions for determining an insertion point indicator that indicates a location in the content stream. The computer-readable medium also comprises instructions for retrieving the content based on the content identifier, and instructions for inserting the content in the content stream at a location indicated by the insertion point indicator.

In one embodiment, a method is provided for inserting content into a content stream for rendering on a device. The method comprises generating one or more annotation parameters that comprise a content identifier and an insertion point, inserting the one or more annotation parameters into the content stream, and transmitting the content stream to the device.

In one embodiment, an apparatus is provided for inserting content into a content stream for rendering on a device. The apparatus comprises annotation generation logic that operates to generate one or more annotation parameters that comprise a content identifier and an insertion point, and insert the one or more annotation parameters into the content stream. The apparatus also comprises transmitting logic that operates to transmit the content stream to the device.

In one embodiment, an apparatus is provided for inserting content into a content stream for rendering on a device. The apparatus comprises means for generating one or more annotation parameters that comprise a content identifier and an insertion point, means for inserting the one or more annotation parameters into the content stream, and means for transmitting the content stream to the device.

In one embodiment, a computer-readable medium is provided that comprises instructions, which when executed by processor logic, operate to insert content into a content stream for rendering on a device. The computer-readable medium comprises instructions for generating one or more annotation parameters that comprise a content identifier and an insertion point. The computer-readable medium also comprises instructions for inserting the one or more annotation parameters into the content stream, and instructions for transmitting the content stream to the device.

DETAILED DESCRIPTION

In one or more embodiments, a content insertion system is provided that operates to provide hierarchical services in a data network. For example, hierarchical services define the arrangement of national, local, and cached content that appears in a content stream received by a device. The system is especially well suited for use in wireless networks environments, but may be used in any type of network environment, including but not limited to, communication networks, public networks, such as the Internet, private networks, such as virtual private networks (VPN), local area networks, wide area networks, long haul network, or any other type of data network.

Figure 1:
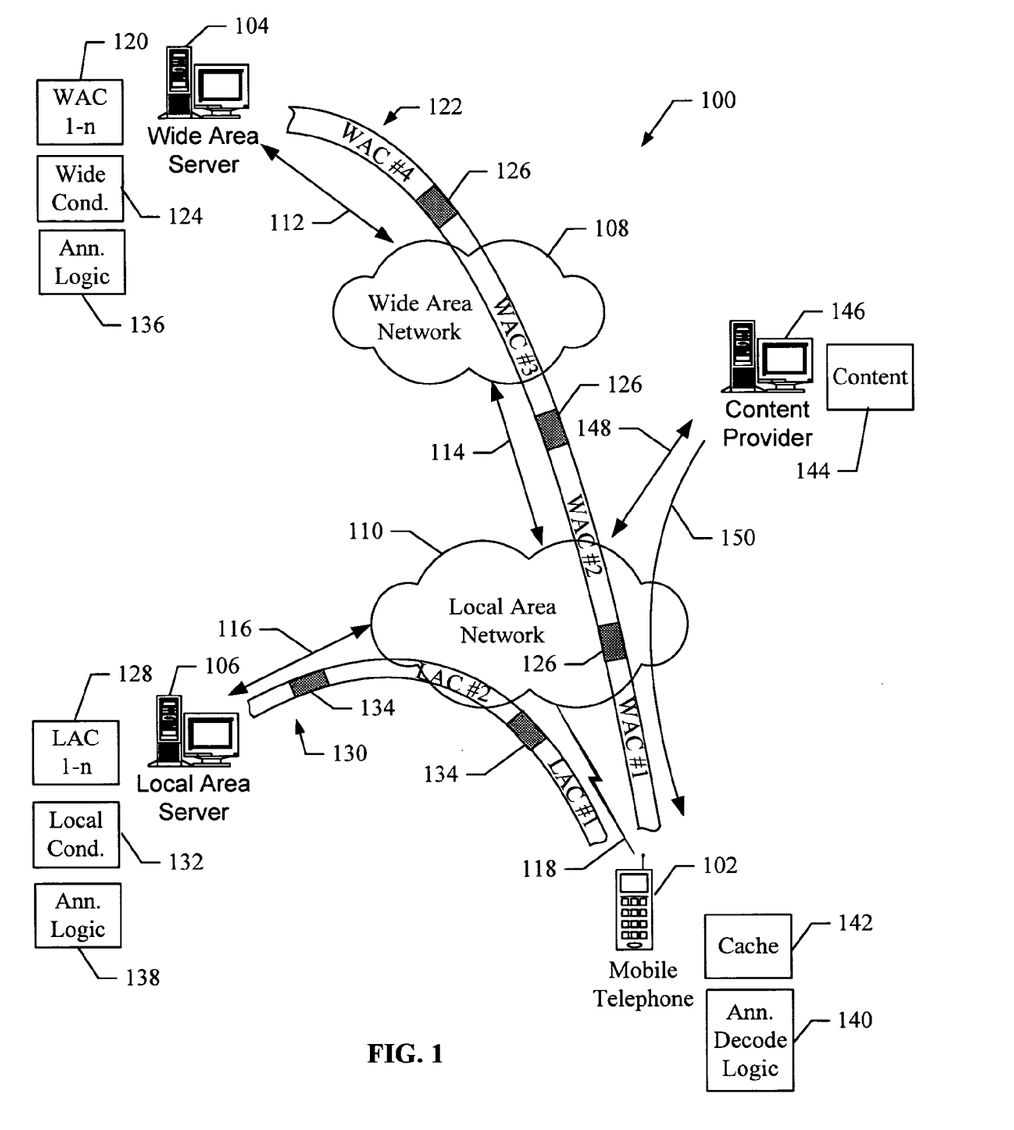
FIG. 1 shows one embodiment of a network that comprises one embodiment of a content insertion system.

FIG. 1 shows one embodiment of a network 100 that comprises one embodiment of a content insertion system. The network 100 comprises a device 102, a wide area server 104, and a local area server 106. The wide area server 104 is coupled to a wide area network 108 via the link 112. The wide area network 108 is further coupled to a local area network 110 via the link 114. The local area network 110 is coupled to the local area server 106 via the link 116, and is also coupled to the device 102 via the wireless link 118.

In one embodiment, the wide area network 108 comprises any combination of wired and/or wireless networks that allows content to be delivered over a wide area. For example the wide area network 108 may deliver content to a county or state, multiple states, or an entire country. The communication links 112 and 114 comprise any suitable communication links, such as wired and/or wireless links, that operate to allow content to be transmitted from the server 104 to the network 108 and the network 110.

The local area network 110 comprises any combination of wired and/or wireless networks that allows content to be delivered over a local area. For example, the local area network 110 may deliver content to a company, neighborhood, city, or county. The local area server 106 communicates with the local area network 110 via the link 116. The link 116 comprises any suitable type of wired or wireless link that allows content to be transmitted from the local area server 106 over the local area network 110.

The device 102 comprises a mobile telephone that communicates with the local area network 110 via the wireless link 118. It should be noted that other devices are possible within the scope of the embodiments. For example, other devices suitable for use in one or more embodiments of the content insertion system comprise a personal digital assistant (PDA), email device, pager, a notebook computer, or a desktop computer. The device 102 operates to receive one or more content streams (or channels) for rendering on the device 102. For example, the content streams comprise streaming multimedia content that includes, for example, news, sports, weather, financial information, movies, and/or any other type of suitable content.

In one embodiment, the servers 104, 106 operate to deliver one or more multiplexed content streams to the device 102. For example, the server 104 comprises N items of wide area content (WAC) 120 and operates to deliver this content to the device 102 in a wide area multiplexed content stream 122. For example, the wide area multiplexed content stream 122 provides a sequential presentation of the wide area content 120. Additionally, the wide area multiplexed content stream 122 includes content slots 126 at selected intervals that are available for inserting selected content. For example, the selected content comprises news, weather, commercials, advertisements and/or other content that is suitable for distribution to devices over a wide area.

Similarly, the server 106 comprises N items of local area content (LAC) 128 and operates to deliver this content to the device 102 in a local area multiplexed content stream 130. The local area multiplexed content stream 130 also comprises content slots 134 at selected intervals that are available for inserting selected content. For example, the selected content comprises news, weather, commercials, advertisements and/or other content that is suitable for distribution to devices over a local area. It should be noted that it is possible for the servers 104, 106 to deliver any number of multiplexed content streams (or channels) to the device 102, however, for the purpose of clarity; only the two content streams 122, 130 are shown in FIG. 1.

In one embodiment, the server 104 comprises annotation logic 136. The annotation logic 136 operates to insert annotation parameters into the wide area multiplexed content stream 122. For example, in one embodiment, the annotation parameters are included at the beginning of the content slots 126. The annotation parameters identify content that is to be inserted over (or substituted for) any content that may be in the content slot 126 included in the wide area multiplexed content stream 122. Similarly, the server 106 comprises annotation logic 138. The annotation logic 138 operates to insert annotation parameters into the local area multiplexed content stream 130. For example, in one embodiment, the annotation parameters are included at the beginning of the content slots 134. The annotation parameters identify content that is to be inserted over (or substituted for) any content that may be in the content slots 134 included in the local area multiplexed content stream 130.

In one or more embodiments, the annotation parameters are generated based on a variety of information. For example, wide area conditional parameters 124 are used to generate the annotation parameters included in the wide area multiplexed stream 122, and local area conditional parameters 132 are used to generate the annotation parameters included in the local area multiplexed stream 130. The conditional parameters are used to control how a device inserts content into a content stream. A more detailed description of the conditional parameters is provided in another section of this document.

In one or more embodiments, the content insertion system allows content to be automatically inserted into a content stream that is received by the device 102. In one embodiment, the device 102 comprises annotation decode logic 140. The device 102 operates to receive one or more content streams from the local area network 110 via the link 118. For example, the device 102 might receive the wide area multiplexed content stream 122 and the local area multiplexed content stream 130. The annotation decode logic 140 operates to decode the annotation parameters included in those streams and insert (or substitute) content into the content slots 126, 134. For example, the annotation decode logic 140 may insert content from the local stream 130 into the wide area stream 122, or content from the wide area stream 122 into the local stream 130. Thus, it is possible for the device to receive and render the wide area stream 122 and still receive local content, such as news, weather, or local advertisements that were provided in the local area multiplexed stream 130.

In another embodiment, the annotation decode logic 140 operates to insert (or substitute) cached content into the content slots 126, 134. For example, the device 102 comprises a cache 142 that includes selected content that has been previously downloaded to the device. In one embodiment, the annotation decode logic 140 operates to decode the annotation parameters and determine that content from the cache 142 is to be inserted into a received content stream. Thus, while the device 102 renders the received content stream, cached content may be inserted and rendered as well.

In still another embodiment, the annotation decode logic 140 operates to decode the annotation parameters included in a received content stream to determine an explicit reference to content that is to be inserted into the content stream. For example, the explicit reference might reference content 144 located at a content provider 146 that is also in communication with the network 110 via the link 148. As a result, the annotation decode logic 140 requests the content 144, which is provided to the device 102 as shown by path 150. The content 144 is then inserted into the received content stream at an insertion point determined from the annotation parameters associated with that stream.

Thus, in one or more embodiments, a server operating in the content insertion system operates to perform one or more of the following functions.

1. Generate annotation parameters for inclusion in one or more content streams that may be received by a device. The annotation parameters specify content to be inserted in a content stream transmitted by the server. Various network, system, administrative, and/or device conditional parameters may be included the annotation parameters.

2. Include the annotation parameters in a content stream to be received by a device. For example, the annotation parameters might be included at the beginning of a content slot in the content stream. In another embodiment, the annotation parameters might be provided to the device separately from the content slot using a separate communication channel.

In one or more embodiments, a device operating in the content insertion system operates to perform one or more of the following functions.

1. Receive content that is cached at the device for later insertion into a content stream.

2. Receive a content stream for rendering on the device.

3. Decode annotation parameters associated with the content stream to determine content to be inserted or substituted at a selected insertion point in the received content stream.

4. Verify that any conditions described by conditional parameters included in the annotation parameters are met.

4. Obtain the content if necessary. For example the annotation parameters may include a reference to cached content or an explicit reference to content provided by a third party, such as a third party content provider.

5. Insert the content into the content stream at an insertion point defined by the annotation parameters.

Therefore, in one or more embodiments, the content insertion system operates to provide hierarchical services in a data network. It should be noted that the implementation described with reference to FIG. 1 is just one implementation and that other implementations are possible within the scope of the embodiments.

Figure 2:
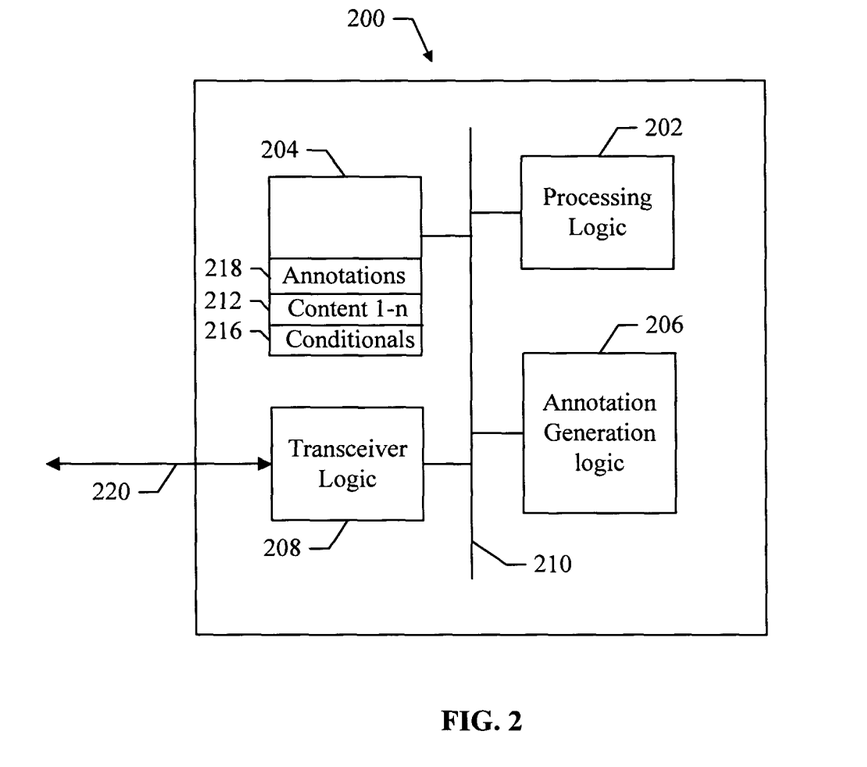
FIG. 2 shows a detailed diagram of one embodiment of a content distribution server suitable for use in one or more embodiments of a content insertion system.

FIG. 2 shows a detailed diagram of one embodiment of a content distribution server 200 suitable for use in one or more embodiments of a content insertion system. For example, the server 200 may be used as the server 104 in FIG. 1. The server 200 comprises processing logic 202, memory 204, annotation generation logic 206, and transceiver logic 208, all coupled to an internal data bus 210. It should be noted that the server 200 is just one implementation and that additions, deletions, changes, and/or rearrangements of the functional elements shown are within the scope of the embodiments.

In one or more embodiments, the processing logic 202 comprises a CPU, processor, gate array, hardware logic, memory elements, virtual machine, software, and/or any combination of hardware and software. Thus, the processing logic 202 generally comprises logic to execute machine-readable instructions and to control one or more other functional elements of the server 200 via the internal data bus 210.

The memory 204 comprises any suitable memory for storing content to be distributed over a data network. For example, the memory 204 stores N content items 212 that are to be distributed over a wide area in a wide area multiplexed content stream. The memory 204 also stores conditional parameters 216 that are associated with the content items 212 and are used to generate annotation parameters. For example, the conditional parameters are used to determine how a device will operate to insert content into a multiplexed content stream.

The annotation generation logic 206 comprises a CPU, processor, gate array, hardware logic, memory elements, virtual machine, software, and/or any combination of hardware and software. The annotation generation logic 206 operates to generate one or more annotation parameters 218 that are included in a multiplexed content stream that is transmitted over a wide area. For example, the annotation generation logic 206 operates to process the conditional parameters 216 to generate annotation parameters 218. In one embodiment, the annotation parameters 218 are included at the beginning of available content slots included in a multiplexed content stream transmitted by the server 200.

The transceiver logic 208 comprises hardware and/or software that operates to allow the server 200 to transmit and receive data and/or other information with remote devices or network systems via communication channel 220. For example, in one embodiment, the communication channel 220 comprises any suitable type of communication link to allow the server 200 to communicate with one or more data networks.

During operation of one or more embodiments of a content insertion system, the server 200 obtains the content items 212 for inclusion into a multiplexed content stream to be transmitted over a data network to one or more devices. The content items 212 may be provided from a content retailer, billing and customer service provider, or any other entity. The conditional parameters 216 may also be provided with the content items 212.

As the content items 212 are incorporated into a content stream for transmission, the annotation generation logic 206 generates annotation parameters 218 that are incorporated into the stream. In one embodiment, the annotation parameters 218 are included at the beginning of available content slots that are also incorporated in the multiplexed content stream. The multiplexed content stream is then transmitted over one or more data networks and received for rendering by one or more devices. The devices operate to decode the annotation parameters and insert or substitute content into the available content slots accordingly. Thus, local or cached content may be inserted into a wide area stream for rendering on a device.

In one embodiment, the content insertion system comprises program instructions stored on a computer-readable medium, which when executed a processor, for instance, the processing logic 202, provides the functions of the server 200 described herein. For example, instructions may be loaded into the server 200 from a computer-readable medium, such as a floppy disk, CDROM, memory card, FLASH memory device, RAM, ROM, or any other type of memory device or computer-readable medium. In another embodiment, the instructions may be downloaded into the server 200 from an external device or network resource that interfaces to the sever 200 via the transceiver logic 208. The instructions, when executed by the processing logic 202, provide one or more embodiments of a content insertion system as described herein.

Figure 3:
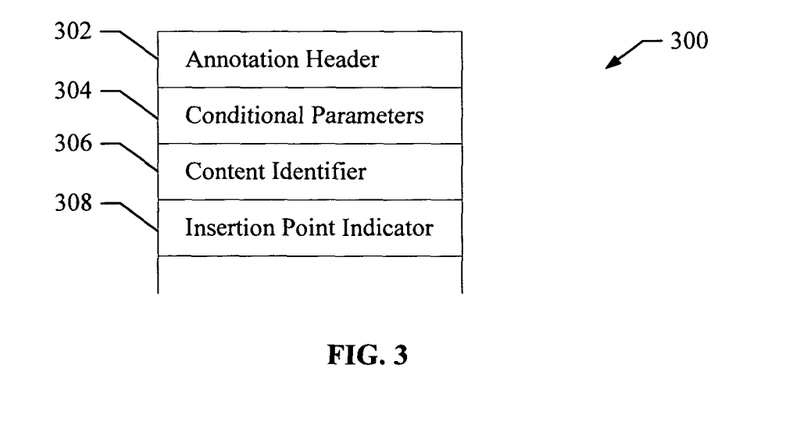
FIG. 3 shows one embodiment of annotation parameters for use in one or more embodiments of a content insertion system.

FIG. 3 shows one embodiment of annotation parameters 300 for use in one or more embodiments of a content insertion system. For example, the annotation parameters 300 are generated by the annotation generation logic 206. The annotation parameters 300 comprise an annotation header 302, conditional parameters 304, content identifier 306, and insertion point indicator 308.

In one embodiment, the annotation header 302 comprises any suitable header that operates to identify the annotation parameters 300. The conditional parameters 304 are parameters that are processed by receiving devices to determine whether or not to insert content into the received content stream. For example, in one or more embodiments, the conditional parameters 304 comprise an area identifier, content package identifier, content provider identifier, time indicator, or content characteristic, such as a rating indicator. In one embodiment, the conditional parameters are used to indicate historical information about selected content. For example, the historical information allows a sequence of content segments to be inserted into a content stream over a selected time interval.

The content identifier 306 identifies content that is to be inserted into the content stream. For example, the content identifier 306 may identify content in the currently received content stream, a different content stream, cached content, or may comprises an explicit reference to content, such as a network address. For example, the explicit reference may be a web site address of a third party content provider where content to be inserted is located.

The insertion point indicator 308 comprises any type of reference into the received content stream that indicates a location where the identified content is to be inserted. For example, in one embodiment, the insertion point indicator 308 is a time reference into the received content stream.

In one embodiment, a receiving device processes the annotation parameters 300 to insert content into a received content stream. For example, the conditional parameters 304 are processed by the receiving device to determine if content is to be inserted into the received stream. If the conditions described by the conditional parameters 304 are met, then the device operates to insert the content identified by the content identifier 306 into the received content stream at a location corresponding to the insertion point indicator 308. It should be noted that the format of the annotation parameters 300 may be of any suitable type and the parameters 300 may also be encoded or encrypted using any suitable technology.

Figure 4:
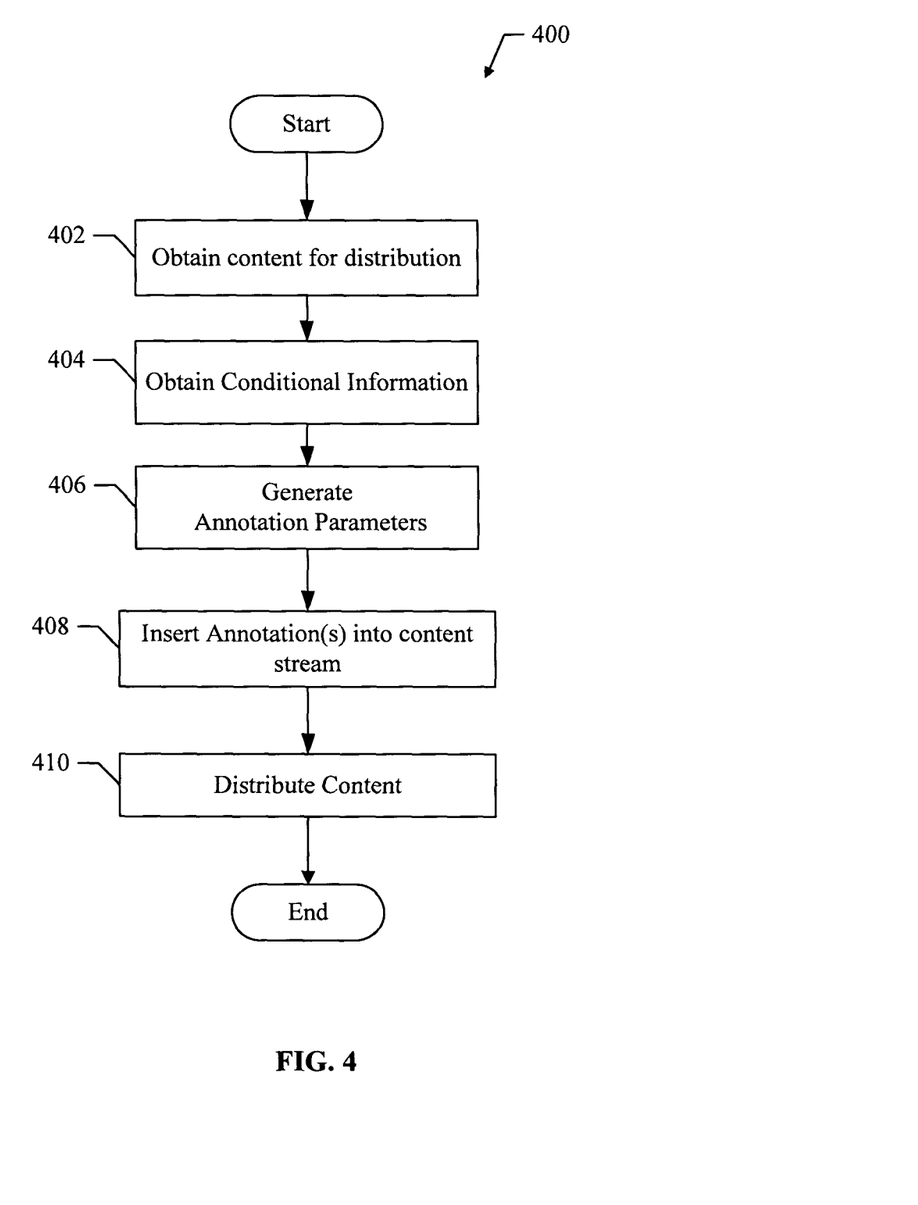
FIG. 4 shows one embodiment of a method for operating a content distribution server in one embodiment of a content insertion system.

FIG. 4 shows one embodiment of a method 400 for operating a content distribution server in one embodiment of a content insertion system. For clarity, the method 400 will be described with reference to the server 200 shown in FIG. 2. In one or more embodiments, the processing logic 202 executes program instructions and controls the operation of the server 200 to perform the functions described below.

At block 402, the server obtains content for distribution. For example, the server 200 obtains content for distribution from a content retailer, service provider, or any other content provider. For example, the server 200 obtains the content items 212 and stores them in the memory 204. The provider of the content items may also provide the conditional parameters 216. In another embodiment, the conditional parameters 216 are maintained at the server 200. For example, the content items 212 might comprise movie, news, or sports content that is assembled into a content stream for transmission to a device. The annotation parameters operate to allow content, such as advertising, commercials, or other relevant content, to be inserted into the content stream by the receiving device.

At block 404, conditional parameters are obtained. For example, the conditional parameters are processed by a receiving device to determine if content is to be inserted. For example, if the conditional parameters specify the geographic area in which the receiving device is currently located, the device will operate to insert content as described by the content identifier in the annotation parameters.

At block 406, annotation parameters are generated for use in a multiplexed content stream that contains the content items. For example, the annotation generation logic 206 generates annotation parameters 218 for use in a multiplexed content stream that contains the content items 212. The annotation parameters 218 include the conditional parameters, content identifier and insertion point indicator. For example, annotation parameters 218 may identify local advertising content that is to be inserted in place of the national advertising content. Thus, the annotation parameters 218 identify the content to be inserted and a selected insertion point in the multiplexed stream. In one embodiment, the insertion point is based on a time reference associated with the multiplexed content stream.

At block 408, the annotation parameters are inserted into the content stream. In one embodiment, the annotation parameters 218 may be incorporated into the content stream, or in another embodiment, may be provided to a device using a separate communication channel.

At block 410, the content is streamed to devices on the data network. For example, the multiplexed content stream is transmitted over a wide area network and/or a local area network to reach one or more devices. The receiving devices then operate to insert identified content at a selected insertion point in the content stream if the conditions described by the conditional parameters are met.

It should be noted that the method 400 illustrates just one implementation and that changes, additions, deletions, or rearrangements of the described functions may be made without deviating from the scope of the described embodiments.

Figure 5:
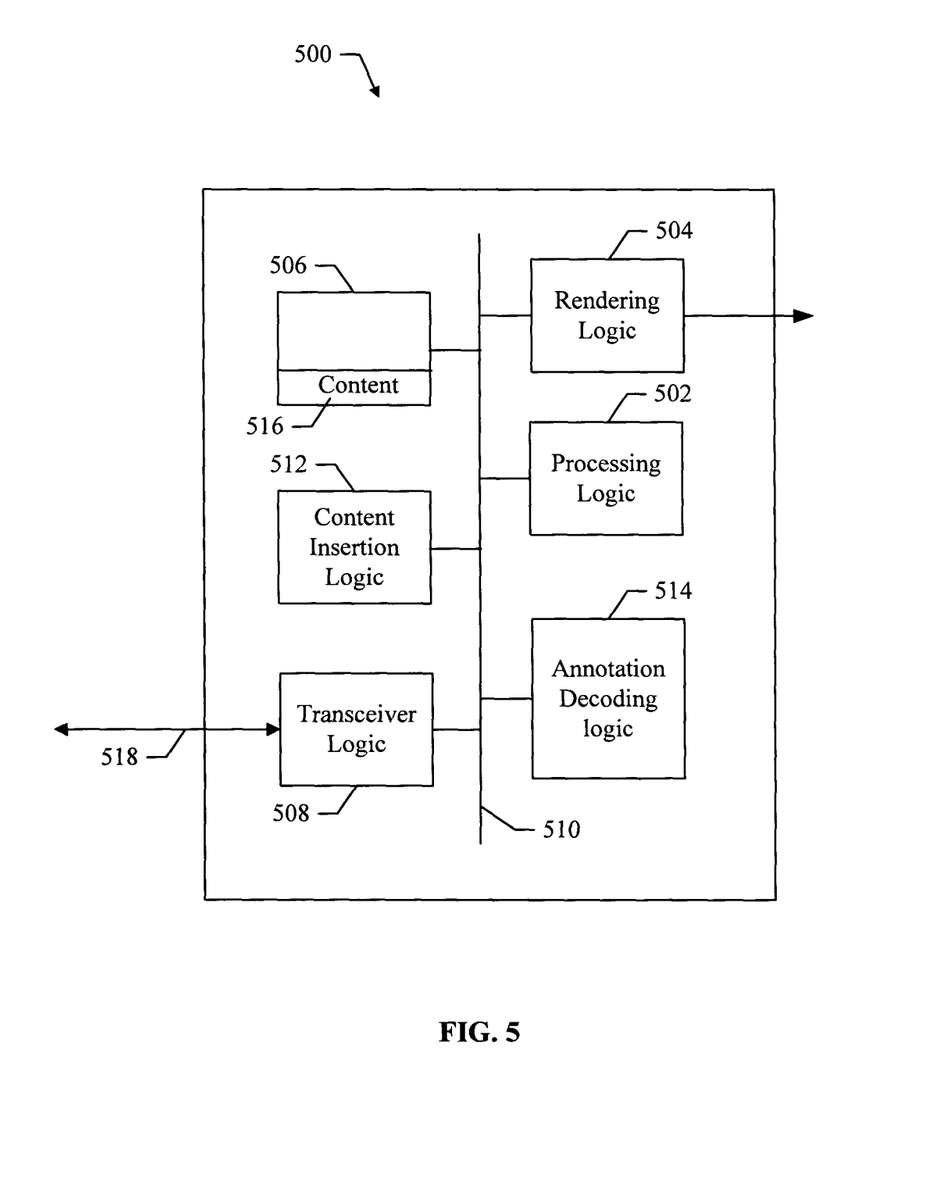
FIG. 5 shows a detailed diagram of one embodiment of a device suitable for use in one or more embodiments of a content insertion system.

FIG. 5 shows a detailed diagram of one embodiment of a device 500 suitable for use in one or more embodiments of a content insertion system. For example, the device 500 may be used as the device 102 in FIG. 1. The device 500 comprises processing logic 502, rendering logic 504, memory 506, and transceiver logic 508 all coupled to an internal data bus 510. The device also comprises content insertion logic 512 and annotation decoding logic 514, which are also coupled to the internal data bus 510. It should be noted that the device 500 is just one implementation and that additions, deletions, changes, and/or rearrangements of the functional elements shown are within the scope of the embodiments.

In one or more embodiments, the processing logic 502 comprises a CPU, processor, gate array, hardware logic, memory elements, virtual machine, software, and/or any combination of hardware and software. Thus, the processing logic 502 generally comprises logic to execute machine-readable instructions and to control one or more other functional elements of the device 500 via the internal data bus 510.

The rendering logic 504 comprises hardware and/or software that allow the device 500 to render content. For example, the rendering logic 504 may comprise audio logic, video logic, display systems, user interface logic and/or any other suitable hardware or software to allow the device to render content.

The memory 506 comprises any type of memory device suitable for storing information and content. For example, the memory 506 may operate as a cache memory to store content 516 for subsequent rendering on the device 500.

The transceiver logic 508 comprises hardware and/or software that operates to allow the device 500 to transmit and receive data and/or other information with remote devices or network systems via communication channel 518. For example, in one embodiment, the communication channel 518 comprises any suitable type of communication link to allow the device 500 to communicate with one or more data networks.

The annotation decoding logic 514 comprises hardware and/or software to allow the device 500 to decode annotation parameters included in a received content stream. For example, the device may receive a multiplexed content stream from a wide area server that includes annotation parameters. The annotation parameters identify content to be inserted at a selected insertion point in the content stream. For example, an insertion point may be defined to allow selected content to be inserted over the existing content included in the received content stream. In one embodiment, the annotation decoding logic 514 determines a content identifier and the insertion point and passes this information to the content insertion logic 512 via the data bus 510.

The annotation decoding logic 514 also processes the annotation parameters to discover any conditional parameters. Any discovered conditional parameters are also passed to the content insertion logic 512 for processing.

The content insertion logic 512 comprises hardware and/or software that operates to allow the device 500 to insert content into a received content stream. In one embodiment, the content insertion logic 512 processes any discovered conditional parameters. For example, the conditional parameters describe conditions that must be met before the device inserts content into the received content stream. The conditional parameters may specify a geographic area in which the device might be located, a content package to which the device might be subscribed to receive, a content retailer to which the device might be associated with, a current time indicator, or a content rating indicator. If the device matches or meets the conditions described by the conditional parameters, then the device is allowed to operate to insert content into the received content stream.

Provided the device meets the requirements of the conditional parameters, the content insertion logic 512 operates to receive a content identifier and insertion point from the annotation decoding logic 514. The content identifier identifies content for insertion into the received content stream. For example, the identifier may identify content in the received content stream, another content stream, content cached in the device's memory (i.e., content 516), or content located by an explicit reference. For example, content located at a third party web site. The content insertion logic 512 operates to obtain the identified content and insert the content in the received content stream at the insertion point. For example, the insertion point may be based on a time reference associated with the received content stream.

In one embodiment, the content insertion logic 512 operates to control the transceiver logic 508 to receive a second content stream from which content will be retrieved. For example, in one embodiment, the second content stream is based on a known time reference and the content identifier identifies the content based on that reference. Thus, it is possible for the content insertion logic 512 to obtain the content from the second stream based on the content identifier.

In one embodiment, the content insertion logic 512 operates to control the transceiver logic 508 to retrieve content from a third party. For example, the content identifier may be an explicit reference to content located at a third party site on a data network. Thus, the transceiver logic 508 operates to access the third party site to retrieve the content identified by the explicit reference.

In one embodiment, the content insertion system comprises program instructions stored on a computer-readable medium, which when executed by a processor in a device, for instance, the processing logic 502, provides the functions of the device 500 described herein. For example, instructions may be loaded into the device 500 from a computer-readable medium, such as a floppy disk, CDROM, memory card, FLASH memory device, RAM, ROM, or any other type of memory device or computer-readable medium. In another embodiment, the instructions may be downloaded into the device 500 from an external device or network resource that interfaces to the device 500 via the transceiver logic 508. The instructions, when executed by the processing logic 502, provide one or more embodiments of a content insertion system as described herein.

Figure 6:
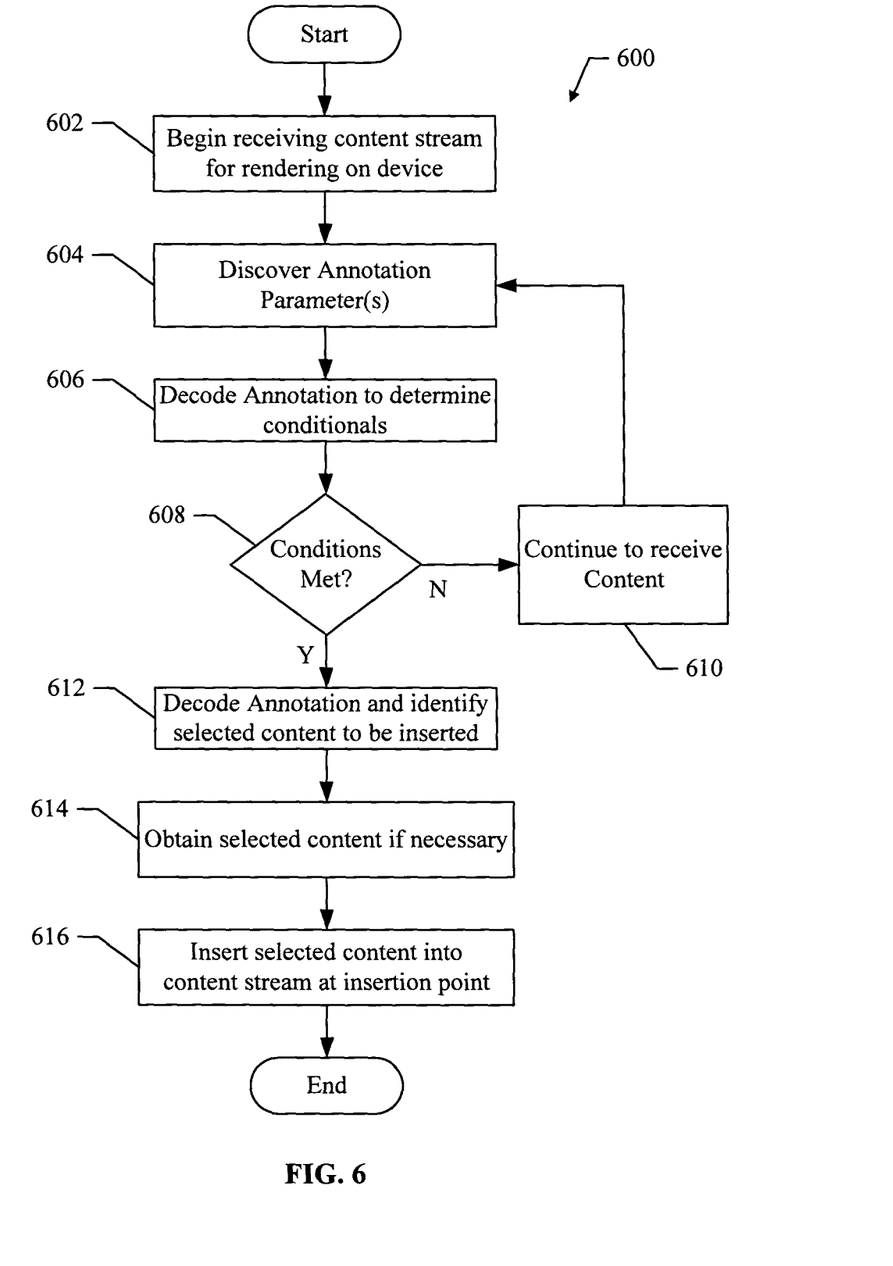
FIG. 6 shows one embodiment of a method for operating a device in one embodiment of a content insertion system.

FIG. 6 shows one embodiment of a method 600 for operating a device in one embodiment of a content insertion system. For clarity, the method 600 will be described with reference to the device 500 shown in FIG. 5. In one or more embodiments, the processing logic 502 executes program instructions to control the device 500 to perform the functions described below.

At block 602, the device begins receiving a multiplexed content stream from a content distribution server. For example, the processing logic 502 controls the transceiver logic 508 to establish a wireless communication link with a data network. In one embodiment, the processing logic 502 request to receive the multiplexed content stream as it is broadcast from the server. Thus, the transceiver logic 508 receives the multiplexed content stream from the data network via the link 518.

At block 604, annotation parameters are discovered in the received content stream. For example, the annotation decoding logic 514 decodes the received content stream and discovers annotation parameters included in the content stream. For example, in one embodiment, the annotation parameters may be formatted using any suitable format and inserted into the content stream.

At block 606, the annotation parameters are decoded to determine if the device meets any conditional parameters included in the annotation parameters. For example, the conditional parameter may describe a geographic area, and if the device is within the geographic area, then it meets the described conditional. Other conditions might be described by the conditional parameters as described above. For example, the content insertion logic 512 operates to decode the conditional parameters and verify that the device satisfies the described conditions. In one embodiment, the device maintains information in the memory 506 to determine if a condition is satisfied. For example, information about the device's current location, subscriptions, retailers associations, and other condition information is maintained in the memory 506. In another embodiment, the device operates to retrieve any information from system or network resources to determine if any particular condition is satisfied.

At block 608, a test is performed to determine if the device meets the conditions described by the conditional parameters. If the device meets the conditions, the method proceeds to block 612. If the device does not meet the conditions, the method proceeds to block 610.

At block 610, the conditions of the received annotation parameters have not been met, so the device continues to receive the content stream. The method proceeds to block 604 where more annotation parameters may be discovered.

At block 612, the annotation parameters are decoded to identify content that is to be inserted into the content stream. The annotation parameters identify at least one content identifier and an insertion point that indicates where in the received content stream the identified content is to be inserted. The content identifier and insertion point information are determined by the annotation decoding logic 514 and sent to the content insertion logic 512.

At block 614, the identified content to be inserted in the content stream is obtained if necessary. For example, if the identified content is located in a local cache or provided by a third party, the content insertion logic 512 operates to obtain the identified content for insertion into the content stream. In one embodiment, the content insertion logic 512 retrieves the identified content from a local cache memory at the device. In another embodiment, the content insertion logic 512 retrieves the identified content from a third party based on an explicit reference included in the annotation parameters.

In still another embodiment, the content insertion logic 512 retrieves the identified content from another content stream. For example, the content is retrieved from a multiplexed local content stream that is also received by the device. It is assumed that one or more content streams received by the device have a common time reference so that content appearing in one stream may be obtained for insertion into another stream.

At block 616, the selected content is inserted in the received content stream at a point indicated by the insertion point. For example, the content stream may be associated with a time reference and the content insertion logic 512 inserts the identified content into the content stream at a selected time reference that corresponds to the insertion point. The device may then render the content stream including the newly inserted content.

Thus, the method 600 operates to allow a device to insert content into a received content stream according to one or more embodiments of a content insertion system. It should be noted that the method 600 illustrates just one implementation and that changes, additions, or rearrangements of the functional elements may be made without deviating from the scope of the described embodiments.

Figure 7:
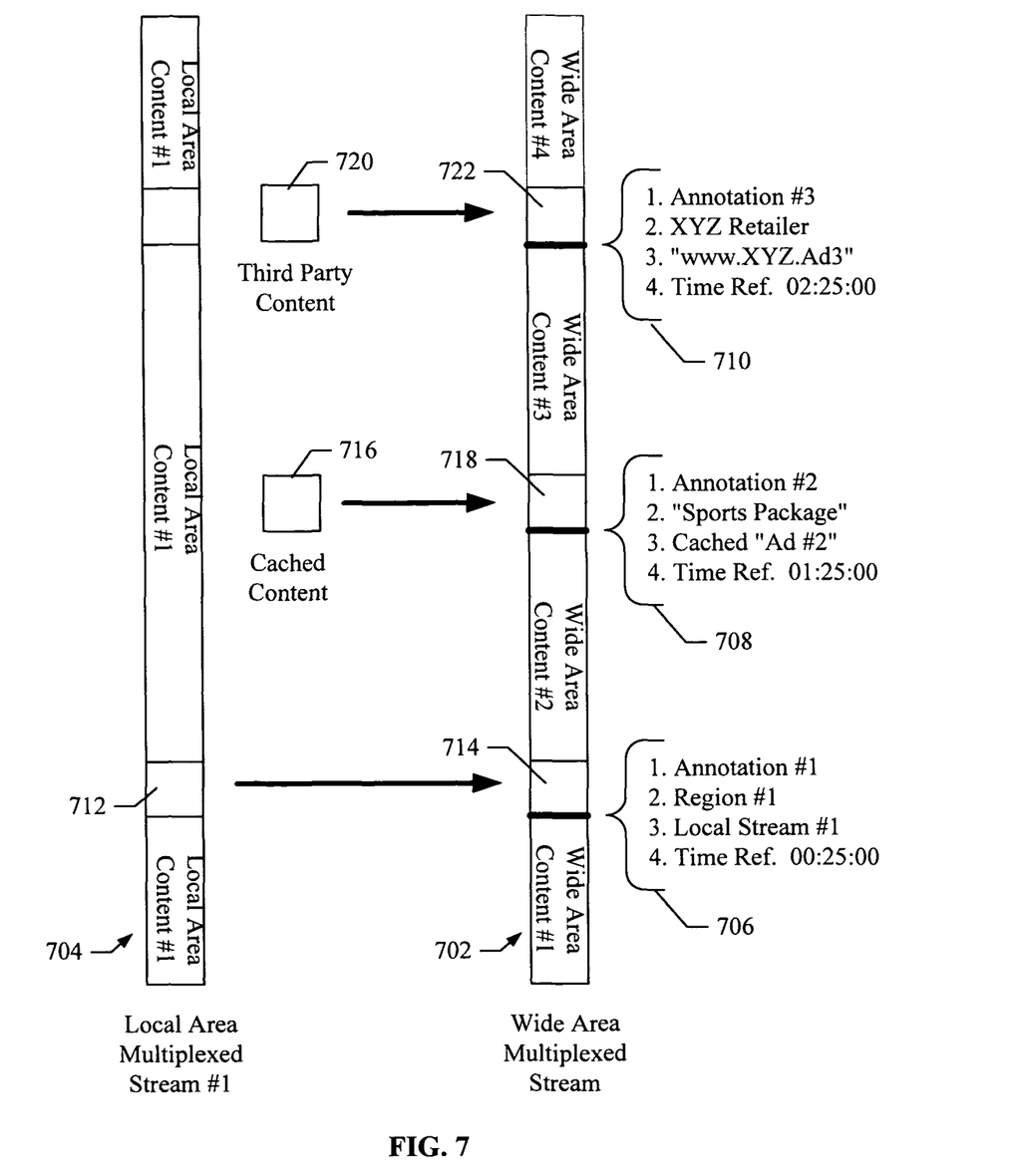
FIG. 7 illustrates how in one or more embodiments, the content insertion system operates to insert content into a received content stream.

FIG. 7 illustrates how in one or more embodiments, the content insertion system operates to insert content into a received content stream. As illustrated in FIG. 7, a device receives a wide area content stream 702 and a local area content stream 704. The wide area content stream 702 includes multiplexed content (wide area content 1-4) and annotation parameters 706, 708, and 710. The annotation parameters identify content to be inserted into the wide area content stream 702 at specific insertion points. For example, the content stream 702 includes available content slots 714, 718, and 722.

The annotation parameters 706 describe a conditional based on geographic region. For example, Region #1 is described as a conditional parameter. If the device is in Region #1 then the content insertion system operates to insert content at a selected insertion point. In this case, it will be assumed that the device is currently within Region #1 so that content will be inserted into the received stream 702. The content identifier identifies content from the local steam 704, and indicates that this content is to be inserted into the wide area content stream 702 at time reference 00:25:00. As a result of the operation of one embodiment of the content insertion system, the identified content in the local area stream 704, shown at 712, is inserted into the wide area stream 702 at time reference 00:25:00, which corresponds to the available content slot shown at 714. For example, the annotation decoding logic 514 discovers the annotation parameters 706 in the content stream 702 and passes the conditional parameter, content identifier and insertion point to the content insertion logic 512. The content insertion logic 512 operates to perform the conditional test, retrieve the content from the local area stream 704 and insert this content into the wide area stream 702 at the insertion point 00:25:00, which is identified by the available content slot 714.

The annotation parameters 708 describe a conditional based on a subscribed content package. For example, the "Sports Package" is described as a conditional parameter. If the device is subscribed to the Sports Package then the content insertion system operates to insert content at a selected insertion point. In this case, it will be assumed that the device is currently subscribed to the Sports Package so that content will be inserted into the received stream 702. The content identifier identifies cached content (Ad #2) to be inserted into the wide area content stream 702 at time reference 01:25:00, which corresponds to the available content slot shown at 718. As a result of the operation of one embodiment of the content insertion system, the identified content in the device's cache memory, shown at 716, is inserted into the wide area stream 702 at time reference 01:25:00 as shown at 718. For example, the annotation decoding logic 514 discovers the annotation parameters 708 in the content stream 702 and passes the conditional, content identifier, and insertion point to the content insertion logic 512. The content insertion logic 512 operates to perform the conditional test, retrieve the cached content (Ad #2) from the memory 506 and insert this content into the wide area stream 702 at the insertion point 01:25:00, which is identified by the available content slot 718.

The annotation parameters 710 describe a conditional based on a retailer association. For example, the retailer "XYZ" is described as a conditional parameter. If the device is associated with the retailer "XYZ" then the content insertion system operates to insert content at a selected insertion point. In this case, it will be assumed that the device is currently associated with the retailer "XYZ" so that content will be inserted into the received stream 702. The content identifier identifies an explicit reference to the content (www.XYZ.Ad3) to be inserted into the wide area content stream 702 at time reference 02:25:00. As a result of the operation of one embodiment of the content insertion system, the identified content retrieved from the third party, shown at 720, is inserted into the wide area stream 702 at time reference 01:25:00 as shown at 722. For example, the annotation decoding logic 514 discovers the annotation parameters 710 in the content stream 702 and passes the conditional, content identifier, and insertion point to the content insertion logic 512. The content insertion logic 512 operates to perform the conditional test, retrieve the third party content (www.XYZ.Ad3) from the data network and insert this content 720 into the wide area stream 702 at the insertion point 02:25:00, which is identified by the available content slot 722.

Thus, in one or more embodiments of a content insertion system, content from a variety of sources may be inserted into a received content stream for rendering on a device. It should be noted that content may be obtained from any type of content stream (both wide area and local area), from a local cache memory, or from a third party. Furthermore, although described with reference to inserting content into a received wide area stream, embodiments are equally suitable for inserting content into local area streams.

In one or more embodiments, the content insertion system operates to insert or replace a segment of audio and/or video content in a content stream. Accordingly, it is preferable that the content stream contain a splice point that may be used for content insertion. Additionally, it is also preferable that the inserted content be formatted in the same manner as the content stream. These preferences are applicable to both audio and video content.

Accordingly, while one or more embodiments of a content insertion system have been illustrated and described herein, it will be appreciated that various changes can be made to the embodiments without departing from their spirit or essential characteristics. Therefore, the disclosures and descriptions herein are intended to be illustrative, but not limiting, of the scope of the invention, which is set forth in the following claims.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The description of the disclosed embodiments is provided to enable any person skilled in the art to make or use the present invention. Various modifications to these embodiments may be readily apparent to those skilled in the art, and the generic principles defined herein may be applied to other embodiments, e.g., in an instant messaging service or any general wireless data communication applications, without departing from the spirit or scope of the invention. Thus, the present invention is not intended to be limited to the embodiments shown herein but is to be accorded the widest scope consistent with the principles and novel features disclosed herein. The word "exemplary" is used exclusively herein to mean "serving as an example, instance, or illustration." Any embodiment described herein as "exemplary" is not necessarily to be construed as preferred or advantageous over other embodiments.

What is claimed is:

1. A computer-implemented method in a server for inserting a content into a multiplexed content stream for rendering on a mobile user device, the method comprising:
    generating an annotation parameter having a content identifier and an insertion point indicator;
    inserting the annotation parameter into the multiplexed content stream; and
    transmitting over one or more data networks to the mobile user device the content to be inserted at the mobile user device and being associated with the annotation parameter, before transmitting the multiplexed content stream to the mobile user device.

2. The method of claim 1, wherein generating the annotation parameter comprises generating one or more conditional parameters.

3. The method of claim 1, wherein the content is stored in a cache memory of the mobile user device.

4. The method of claim 1, wherein the content identifier identifies the content based on an explicit reference.

5. The method of claim 1, wherein the mobile user device is a mobile telephone.

6. The method of claim 1, wherein the content comprises an advertisement.

7. A computer-implemented apparatus in a server configured for inserting a content into a multiplexed content stream for rendering on a mobile user device, the apparatus comprising:
    a memory;
    a processor coupled to the memory, wherein the processor comprises:
    an annotation generation logic that operates to (i) generate an annotation parameter having a content identifier and an insertion point indicator, and (ii) insert the annotation parameter into the multiplexed content stream; and
    a transmitter coupled to the processor and configured to transmit over one or more data networks to the mobile user device the content to be inserted at the mobile user device and being associated with the annotation parameter, before transmitting the multiplexed content stream to the mobile user device.

8. The apparatus of claim 7, wherein the annotation generation logic that operates to generate the annotation parameter also generates one or more conditional parameters.

9. The apparatus of claim 7, wherein the content is stored in a cache memory of the mobile user device.

10. The apparatus of claim 7, wherein the content identifier identifies the content based on an explicit reference.

11. The apparatus of claim 7, wherein the mobile user device is a mobile telephone.

12. The apparatus of claim 7, wherein the content comprises an advertisement.

13. A computer-implemented apparatus in a server for inserting a content into a multiplexed content stream for rendering on a mobile user device, the apparatus comprising:
a memory;
a processor coupled to the memory, wherein the processor comprises:
means for generating an annotation parameter having a content identifier and an insertion point indicator; and
means for inserting the annotation parameter into the multiplexed content stream, and
means for transmitting over one or more data networks to the mobile user device the content to be inserted at the mobile user device and being associated with the annotation parameter, before transmitting the multiplexed content stream to the mobile user device.

14. The apparatus of claim 13, wherein means for generating the annotation parameter comprises means for generating one or more conditional parameters.

15. The apparatus of claim 13, wherein the content is stored in a cache memory of the mobile user device.

16. The apparatus of claim 13, wherein the content identifier identifies the content based on an explicit reference.

17. The apparatus of claim 13, wherein the mobile user device is a mobile telephone.

18. The apparatus of claim 13, wherein the content comprises an advertisement.

19. A non-transitory server-readable storage medium having stored thereon server-executable software instructions configured to cause a server processor to perform operations for inserting a content into a multiplexed content stream for rendering on a mobile user device, the operations comprising:
generating an annotation parameter having a content identifier and an insertion point indicator;
inserting the annotation parameter into the multiplexed content stream; and
transmitting over one or more data networks to the mobile user device the content to be inserted at the mobile user device and being associated with the annotation parameter, before transmitting the multiplexed content stream to the mobile user device.

20. The non-transitory server-readable storage medium of claim 19, wherein the stored server-executable software instructions are configured to cause a server processor to perform operations such that generating the annotation parameter comprises generating one or more conditional parameters.

21. The non-transitory server-readable storage medium of claim 19, wherein the stored server-executable software instructions are configured to cause a server processor to perform operations such that the content is stored in a cache memory of the mobile user device.

22. The non-transitory server-readable storage medium of claim 19, wherein the stored server-executable software instructions are configured to cause a server processor to perform operations such that the content identifier identifies the content based on an explicit reference.

23. The non-transitory server-readable storage medium of claim 19, wherein the stored server-executable software instructions are configured to cause a server processor to perform operations such that the mobile user device for rendering is a mobile telephone.

24. The non-transitory server-readable storage medium of claim 19, wherein the stored server-executable software instructions are configured to cause a server processor to perform operations such that the content comprises an advertisement.

25. A computer-implemented method in a mobile user device for rendering content on the mobile user device, the method comprising:
receiving, from a server over one or more data networks, content to be inserted into a multiplexed content stream and being associated with an annotation parameter, before receiving the multiplexed content stream from the server;
obtaining the annotation parameter from the multiplexed content stream, wherein the annotation parameter comprises a content identifier and an insertion point indicator; and
inserting the content into the multiplexed content stream based on the annotation parameter,
wherein the mobile user device is configured to decode the annotation parameter and one of insert and substitute the content into an available content slot in the multiplexed content stream based on the annotation parameter.

26. The method of claim 25, wherein the content is stored in a cache memory of the mobile user device.

27. The method of claim 25, wherein the content identifier identifies the content based on an explicit reference.

28. The method of claim 25, wherein the mobile user device is a mobile telephone.

29. The method of claim 25, wherein the content comprises an advertisement.

30. A mobile user device, comprising:
a transceiver;
a hardware processor coupled to the transceiver, wherein the hardware processor is configured with processor-executable instructions to perform operations comprising:
receiving, from a server over one or more data networks, content to be inserted into a multiplexed content stream and being associated with an annotation parameter, before receiving the multiplexed content stream from the server;
obtaining the annotation parameter from the multiplexed content stream, wherein the annotation parameter comprises a content identifier and an insertion point indicator; and
inserting the content into the multiplexed content stream based on the annotation parameter, and
wherein the hardware processor is configured with processor-executable instructions to decode the annotation parameter and one of insert and substitute the content into an available content slot in the multiplexed content stream based on the annotation parameter.

31. The mobile user device of claim 30, wherein the hardware processor is configured with processor-executable instructions to perform operations such that the content is stored in memory of the mobile user device.

32. The mobile user device of claim 30, wherein the hardware processor is configured with processor-executable instructions to perform operations such that the content identifier identifies the content based on an explicit reference.

33. The mobile user device of claim 30, wherein the mobile user device is a mobile telephone.

34. The mobile user device of claim 30, wherein the hardware processor is configured with processor-executable instructions to perform operations such that the content comprises an advertisement.

35. A non-transitory processor-readable storage medium having stored thereon processor-executable instructions, wherein the stored processor-executable instructions are configured to cause a processor of a mobile user device to perform operations comprising:
   receiving, from a server over one or more data networks, content to be inserted into a multiplexed content stream and being associated with an annotation parameter, before receiving the multiplexed content stream from the server;
   obtaining the annotation parameter from the multiplexed content stream, wherein the annotation parameter comprises a content identifier and an insertion point indicator; and
   inserting the content into the multiplexed content stream based on the annotation parameter, and
   wherein the stored processor-executable instructions are configured to cause a processor of a mobile user device to decode the annotation parameter and one of insert and substitute the content into an available content slot in the multiplexed content stream based on the annotation parameter.

36. The non-transitory processor-readable storage medium of claim 35, wherein the stored processor-executable instructions are configured to cause a mobile user device processor to perform operations such that the content is stored in a cache memory of the mobile user device.

37. The non-transitory processor-readable storage medium of claim 35, wherein the stored processor-executable instructions are configured to cause a mobile user device processor to perform operations such that the content identifier identifies the content based on an explicit reference.

38. The non-transitory processor-readable storage medium of claim 35, wherein the stored processor-executable instructions are configured to cause a mobile user device processor to perform operations such that the content comprises an advertisement.

39. A mobile user device, comprising:
   a memory; and
   a processor coupled to the memory, wherein the processor comprises:
      means for receiving, from a server over one or more data networks, content to be inserted into a multiplexed content stream and being associated with an annotation parameter, before means for receiving the multiplexed content stream from the server;
      means for obtaining the annotation parameter from the multiplexed content stream, wherein the annotation parameter comprises a content identifier and an insertion point indicator; and
      means for inserting the content into the multiplexed content stream based on the annotation parameter, and
   wherein the means for inserting the content into the multiplexed content stream is configured to decode the annotation parameter and one of insert and substitute the content into an available content slot in the multiplexed content stream based on the annotation parameter.

40. The mobile user device of claim 39, wherein the content is stored in a cache memory of the mobile user device.

41. The mobile user device of claim 39, wherein the content identifier identifies the content based on an explicit reference.

42. The mobile user device of claim 39, wherein the mobile user device is a mobile telephone.

43. The mobile user device of claim 39, wherein the content comprises an advertisement.

\* \* \* \* \*